United States Patent Office 3,466,314
Patented Sept. 9, 1969

3,466,314
SILICON COMPOUNDS
Kurt Moedritzer, Webster Groves, and John R. Van Wazer, Ladue, Mo., assignors to Monsanto Company, St. Louis, Mo., a corporation of Delaware
No Drawing. Filed Jan. 3, 1966, Ser. No. 517,966
Int. Cl. C07f 7/02; H01b 3/46
U.S. Cl. 260—448.2     22 Claims The present invention relates to novel organometallic compounds which contain silicon, and also to processes for the preparation of such compounds.

According to the invention, there are provided new and valuable silicon containing compounds having the general formula:

$$R_{4-n}SiX_{n-m}Y_m$$

in which R is selected from the group consisting of hydrocarbyl radicals having from 1 to 20 carbon atoms, such as saturated and unsaturated alkyl and cycloalkyl radicals having from 1 to 20 carbon atoms, and phenyl and substituted phenyl radicals having from 6 to 20 carbon atoms; X is different from Y and is selected from the group consisting of a halogen such as fluorine, chlorine, bromine and iodine as well as alkoxyl, thioalkyl, dialkylamino, cyano, cyanate, thiocyanate, azide and acetylide radicals; and Y is selected from the group consisting of cyano, cyanate and thiocyanate radicals; $n$ is a whole number from 2 to 3; $m$ is a whole number from 1 to 2, with the requirement that $m$ be less than $n$. For example, when $n$ is 3, $m$ is 1, and X is fluorine and Y is cyano, the product is $$RSiF_2(CN)$$

having a molecular weight of 109 for R equals $CH_3$.

The compounds of the present invention may be grouped into several categories, based upon the general formula $R_{4-n}SiX_{n-m}Y_m$ set forth above.

(A) $n=3$, $RSiX_{3-m}Y_m$, $m=1$ or 2.
(B) $n=2$, $R_2SiXY$.

Specific examples within these categories are shown below:

(A) $CH_3SiCl_2(CN)$, $CH_3SiCl(CN)_2$, $$CH_3SiBr(NCO)_2$$

$CH_3SiBr_2(NCO)$, $CH_3SiF(NCS)_2$, $CH_3SiF_2(NCS)$, $$C_6H_5Si(OCH_3)(CN)_2$$

$C_6H_5Si(OCH_3)_2(CN)$, $C_2H_5Si(SCH_3)(NCS)_2$, $$C_2H_5Si(SCH_3)_2(NCS)$$

$C_{10}H_{21}Si[N(CH_3)_2](NC)_2$, $C_{10}H_{21}Si[N(CH_3)_2]_2(CN)$, $$CH_3C_6H_4Si(N_3)(NCO)_2$$

$CH_3C_6H_4Si(N_3)_2(NCO)$, $CH_3Si(CN)(CNO)_2$, $$CH_3Si(CN)_2(CNO)$$

(B) $(CH_3)_2SiCl(CN)$, $(CH_3)_2SiBr(CN)$, $$(CH_3)_2SiI(CN)$$

$(C_2H_5)(CH_3)Si(OCH_3)(CNO)$, $$(C_2H_5)_2Si(OCH_3)(CNS)$$

$(C_2H_5)_2Si[N(CH_3)_2](CN)$, $(C_6H_5)_2Si(CN)(NCS)$, $$(CH_3)_2Si(NCO)(NCS)$$

The general method of preparation of the novel silicon compounds, $R_{4-n}SiX_{n-m}Y_m$ utilizes pairs of compounds of the general formula $R_{4-n}SiX_n$ and $R_{4-n}SiY_n$ (with the meanings of R, X, Y, $m$ and $n$ as described above) which are reacted in the respective mole proportions of 1:0.05 to 1:50, or preferably 1:0.2 to 1:5. A specific range of proportions to yield any desired compound is approximately stoichiometric, as shown below, although the broader ranges are helpful in carrying the reaction to completion with respect to any specific starting material.

| Category | Major product | Prepared from— |
|---|---|---|
| $n=3$ | $RMX_2Y$ | $2RMX_3+RMY_3$ |
|  | $RMXY_2$ | $RMX_3+2RMY_3$ |
| $n=2$ | $R_2MXY$ | $R_2MX_2+R_2MY_2$ |

The mixtures of the two components undergoes reaction at a temperature from $-20°$ C. to $300°$ C., a preferred range being from $25°$ C. to $150°$ C. The compounds that result exist as variously mixed substituted species of the general formula $R_{4-n}SiX_{n-m}Y_m$ appearing in various proportions depending on the mole proportions of the reactants. As an example methyltricyanatosilane is reacted with methyl-trimethylmercaptosilane in the mol proportion 1:2 to obtain the products, methyldicyanatomethylmercaptosilane and methyldimethylmercapto-cyanatosilane in the mol proportion of 1:2. As another specific example fluorobis(cyanato)methylsilane is obtained by heating and mixing together methyltrifluorosilane with methyltricyanatosilane at a temperature of about $100°$ in a pressure vessel.

Separation of the mixed products from the reaction mixture is carried out by conventional means such as chromatography, countercurrent extraction in a solvent, or distillation. However, the mixtures of variously substituted compounds which are obtained may often be used in the form of mixtures for certain industrial applications.

The preparative reaction is preferably conducted in a closed vessel, although the use of relatively high boiling starting materials, e.g., a boiling point of at least $100°$ C. for the silane material, permits the use of an open vessel.

While the silicon components described above react without a catalyst, it has been found that Lewis acid type catalysts provide a faster reaction to obtain the present products. For example, aluminum chloride, boron trifluoride, zinc dichloride, ferric tribromide and antimony pentachloride are representative catalysts which are useful in the present process.

The aforesaid reactants are preferably sealed into a reaction vessel, autoclave or reaction tubes using an inert atmosphere such as nitrogen or helium gas. The reaction vessels are then maintained at a temperature in the range of from $-20°$ C. to $300°$ C., for example at $100°$ C. for a period of time of from 1 hour to 200 hours, with the higher temperatures providing a shorter reaction time. If desired, a solvent, for example an aromatic hydrocarbon, such as benzene, an aliphatic hydrocarbon such as hexane, or an oxygen or halogen containing solvent such as ether or carbon tetrachloride, may be employed although a solvent is not essential. The products of the present invention have good stability.

The following examples illustrate specific embodiments of the present invention.

Example 1

The preparation of the mixed methylmercapto and cyanato group containing methylsilicon compounds is shown in the present example. A pressure tube is charged with 0.01 mol of methyltricyanatosilane together with 0.01 of a mol of methyltris(methylmercapto)silane. The tube containing this mixture is sealed under nitrogen, and is then heated in a tube furnace at about $120°$ C. Other tubes are similarly charged with the ratios of the reactants as shown in the table below. The porgress of the reaction is followed by withdrawing the tube from the furnace from time to time and measuring the presence of the desired mixed compound reaction products having the formulae $CH_3Si(CNO)_2(SCH_3)$ and $$CH_3Si(CNO)(SCH_3)_2$$

by proton nuclear magnetic resonance. The table below shows the relationship of the two components in the products.

DISTRIBUTION (MOL PERCENT) OF MIXED CYANATO METHYLMERCAPTOSILANES

| Mol Ratio (Reactants) $CH_3Si(NCO)_3$ to $CH_3Si(SCH_3)_3$ | Mol percent $CH_3Si(CNO)_2(SCH_3)$ | Mol percent $CH_3Si(CNO)(SCH_3)_2$ |
|---|---|---|
| 1:3 | 22.8 | 77.2 |
| 1:1.5 | 38.1 | 61.9 |
| 1:0.88 | 48.5 | 51.5 |
| 1:0.44 | 57.4 | 42.6 |
| 1:0.2 | 69.9 | 30.1 |

In order to separate the desired compounds from the reaction mixture, separation procedures such as chromatographic obsorption and distillation are employed. Distillation is preferably carried out under vacuum conditions. For example, the compound $CH_3Si(NCO)_2(SCH_3)$ has a boiling point of approximately 50° C. at 25 mm. pressure, while the compound $CH_3Si(NCO)(SCH_3)_2$ shown above has a boiling point of 90° C. at 25 mm. pressure. Separation of the two compounds is readily carried out by distillation.

Identification of the molecular characterization of the compositions of the present example is conducted by the following procedure. The compound $$CH_3Si(NCO)_2(SCH_3)$$

is identified by the proton nuclear magnetic resonance spectrum with two peaks of equal area at −0.55 and −2.00 p.p.m. The compound $CH_3Si(NCO)(SCH_3)_2$ gives proton nuclear magnetic resonance at −0.63 and −2.02 p.p.m. in the calculated ratio of 2:1 for methyl groups on sulfur versus methyl groups on silicon.

Example 2

When the procedure of Example 1 is used with 10 millimoles of methyltrichlorosilane and 5 millimoles of methyltricyanosilane as the reactants in 50 milliliters of benzene as the solvent, with reaction being conducted at 75° C., the major product is methyldichlorocyanosilane.

Example 3

When the procedure of Example 1 is used with 5 millimoles of methyltrichlorosilane and 10 millimoles of methyltricyanosilane as the reactants in 50 milliliters of benzene as the solvent, with reaction being conducted at 75° C., the major product is methylchlorodicyanosilane.

Example 4

When the procedure of Example 1 is used with 10 millimoles of methyltrichlorosilane and 5 millimoles of methyltrithiocyanosilane as the reactants in 50 milliliters of benzene as the solvent, with reaction being conducted at 75° C., the major product is methyldichlorothiocyanosilane. This product is characterized by NMR analysis as having a proton NMR chemical shift of −0.825 p.p.m. relative to tetramethylsilane.

Example 5

When the procedure of Example 1 is used with 5 millimoles of methyltrichlorosilane and 10 millimoles of methyltrithiocyanosilane as the reactants in 50 milliliters of benzene as the solvent, with reaction being conducted at 75° C., the major product is methyldithiocyanochlorosilane. This product is characterized by NMR analysis as having a proton NMR chemical shift of −0.587 p.p.m. relative to tetramethylsilane.

Example 6

When the procedure of Example 1 is used with 10 millimoles of methyltribromosilane and 5 millimoles of methyltricyanatosilane as the reactants in 50 milliliters of benzene as the solvent, with reaction being conducted at 75° C., the major product is methyldibromocyanatosilane. This product is characterized by NMR analysis as having a proton NMR chemical shift of −1.148 p.p.m. relative to tetramethylsilane.

Example 7

When the procedure of Example 1 is used with 5 millimoles of methyltribromosilane and 10 millimoles of methyltricyanatosilane as the reactants in 50 milliliters of benzene as the solvent, with reaction being conducted at 75° C., the major product is methyldicyanatobromosilane. This product is characterized by NMR analysis as having a proton NMR chemical shift of −0.825 p.p.m. relative to tetramethylsilane.

Example 8

When the procedure of Example 1 is used with 3 millimoles of methyltrichlorosilane and 6 millimoles of methyltricyanatosilane as the reactants in 50 milliliter of xylene as the solvent, with reaction being conducted at 50° C., the major product is methyldicyanatochlorosilane. This product is characterized as having a proton NMR chemical shift of −0.663 p.p.m. relative to tetramethylsilane.

Example 9

When the procedure of Example 1 is used with 6 millimoles of methyltrichlorosilane and 3 millimoles of methyltricyanatosilane as the reactants in 50 milliliters of xylene as the solvent, with reaction being conducted at 50° C., the major product is methylcyanatodichlorosilane. This product is characterized by NMR analysis as having a proton NMR chemical shift of −0.847 p.p.m. relative to tetramethylsilane.

Example 10

When the procedure of Example 1 is used with 2 millimoles of methyltricyanatosilane and 4 millimoles of methyltrithiocyanosilane as the reactants in 50 milliliter of toluene as the solvent, with reaction being conducted at 150° C., the major product is methyldithiocyanocyanatosilane. The product is characterized as having a proton NMR chemical shift of +0.003 p.p.m. relative to tetramethylsilane.

Example 11

When the procedure of Example 1 is used with 4 millimoles of methyltricyanatosilane and 2 millimoles of methyltrithiocyanosilane as the reactants in 50 milliliter of toluene as the solvent, with reaction being conducted at 150° C., the major product is methyldicyanatothiocyanosilane. The product is characterized by NMR analysis as having a proton NMR chemical shift of −0.027 p.p.m. relative to tetramethylsilane.

Example 12

When the procedure of Example 1 is used with 3 millimoles of phenyltrisdimethylaminosilane and 6 millimoles of phenyltricyanatosilane as the reactants in 50 milliliter of toluene as the solvent, with reaction being conducted at 25° C., the major product is phenyldicyanatodimethylaminosilane.

Example 13

When the procedure of Example 1 is used with 6 millimoles of phenyltrisdimethylaminosilane and 3 millimoles of phenyltricyanatosilane as the reactants in 50 milliliter of toluene as the solvent, with reaction being conducted at 25° C., the major product is phenylcyanatobisdimethylaminosilane.

Example 14

When the procedure of Example 1 is used with 2 millimoles of n-propyltricyanatosilane and 4 millimoles of n-propyltribromosilane as the reactants in 50 milliliter of toluene as the solvent, with reaction being conducted at 75° C., the major product is n-propyldibromocyanatosilane.

Example 15

When the procedure of Example 1 is used with 4 millimoles of n-propyltricyanatosilane and 2 millimoles of n-puropyltribromosilane as the reactants in 50 milliliter of xylene as the solvent, with reaction being conducted at 75° C., the major product is n-propyldicyanatobromosilane.

Example 16

When the procedure of Example 1 is used with 5 millimoles of n-butyltrithiocyanosilane and 10 millimoles of n-butyltrimethoxysilane as the reactants in 30 milliliter of xylene as the solvent, with reaction being conducted at 50° C., the major product is n-butylbismethoxythiocyanosilane.

Example 17

When the procedure of Example 1 is used with 10 millimoles of n-butyltrithiocyanosilane and 5 millimoles of n-butyltrimethoxysilane as the reactants in 30 milliliter of xylene as the solvent, with reaction being conducted at 50° C., the major product is n-butyldithiocyanomethoxysilane.

Example 18

When the procedure of Example 1 is used with 3 millimoles of n-octyltrisdimethylaminosilane and 6 millimoles of n-octyltricyanosilane as the reactants in 25 milliliter of xylene as the solvent, with reaction being conducted at 150° C., the major product is n-octyldicyanodimethylaminosilane.

Example 19

When the procedure of Example 1 is used with 6 millimoles of n-octyltrisdimethylaminosilane and 3 millimoles of n-octyltricyanosilane as the reactants in 25 milliliter of xylene as the solvent, with reaction being conducted at 150° C., the major product is n-octylbisdimethylaminocyanosilane.

Example 20

When the procedure of Example 1 is used with 2 millimoles of benzyltrichlorosilane and 4 millimoles of benzyltricyanosilane as the reactants in 25 milliliter of xylene as the solvent, with reaction being conducted at 50° C., the major product is benzyldicyanochlorosilane.

Example 21

When the procedure of Example 1 is used with 4 millimoles of benzyltrichlorosilanes and 2 millimoles of benzyltricyanosilane as the reactants in 25 milliliter of xylene as the solvent, with reaction being conducted at 50° C., the major product is benzyldichlorocyanosilane.

Example 22

When the procedure of Example 1 is used with 1.5 millimoles of cyclohexyltrifluorosilane and 3 millimoles of cyclohexyltristhiocyanosilane as the reactants in 25 milliliter of xylene as the solvent, with reaction being conducted at 750° C., the major product is cyclohexyldithiocyanofluorosilane.

Example 23

When the procedure of Example 1 is used with 3 millimoles of cyclohexyltrifluorosilane and 1.5 millimoles of cyclohexyltrithiocyanosilane as the reactants in 25 milliliter of xylene as the solvent, with reaction being conducted at 75° C., the major product is cyclohexyldifluorothiocyanosilane.

Example 24

When the procedure of Example 1 is used with 4 millimoles of n-butyltrismethylmercaptosilane and 2 millimoles of n-butyltrithiocyanosilane as the reactants in 50 milliliter of benzene as the solvent, with reaction being conducted at 50° C., the major product is n-butylbismethylmercaptothiocyanosilane.

Example 25

When the procedure of Example 1 is used with 2 millimoles of n-butyltrismethylmercaptosilane and 4 millimoles of n-butyltrithiocyanosilane as the reactants in 50 milliliter of benzene as the solvent, with reaction being conducted at 50° C., the major product is n-butyldithiocyanomethylmercaptosilane.

Example 26

When the procedure of Example 1 is used with 3 millimoles of ethyltricyanosilane and 6 millimoles of ethyltriethoxysilane as the reactants in 50 milliliter of benzene as the solvent, with reaction being conducted at 100° C., the major product is ethyldiethoxycyanosilane.

Example 27

When the procedure of Example 1 is used with 4 millimoles of dimethyldichlorosilane and 4 millimoles of dimethyldicyanosilane as the reactants in 25 milliliter of benzene as the solvent, with reaction being conducted at 50° C., the major product is dimethylchlorocyanosilane. This product is characterized by NMR analysis as having a proton NMR chemical shift of −0.362 p.p.m. relative to tetramethylsilane.

Example 28

When the procedure of Example 1 is used with 2 millimoles of dimethyldibromosilane and 2 millimoles of dimethyldicyanosilane as the reactants in 25 milliliter of benzene as the solvent, with reaction being conducted at 50° C., the major product is dimethylbromocyanosilane. This product is characterized by NMR analysis as having a portion NMR chemical shift of −0.858 p.p.m. relative to tetramethylsilane.

Example 29

When the procedure of Example 1 is used with 2 millimoles of dimethylbismethylmercaptosilane and 2 millimoles of dimethyldicyanosilane as the reactants in 30 milliliter of benzene as the solvent, with reaction being conducted at 50° C, the major product is dimethylmethylmercaptocyanosilane. This product is characterized by NMR analysis as having proton NMR chemical shifts of −0.575 and −2.108 p.p.m. relative to tetramethylsilane.

Example 30

When the procedure of Example 1 is used with 3 millimoles of dimethyldithiocyanosilane and 3 millimoles of dimethyldicyanosilane as the reactants in 30 milliliter of benzene as the solvent, with reaction being conducted at 50° C., the major product is dimethylthiocyanocyanosilane. This product is characterized by NMR analysis as having a proton NMR chemical shift of −0.013 p.p.m. relative to tetramethylsilane.

Example 31

When the procedure of Example 1 is used with 4 millimoles of dimethyldichlorosilane and 4 millimoles of dimethyldicyanatosilane as the reactants in 25 milliliter of hexane as the solvent, with reaction being conducted at 50° C., the major product is dimethylcyanatochlorosilane. This produce is characterized by NMR analysis as having a proton NMR chemical shift of −0.550 p.p.m. relative to tetramethylsilane.

Example 32

When the procedure of Example 1 is used with 3 millimoles of dimethyldibromosilane and 3 millimoles of dimethyldicyanatosilane as the reactants in 25 milliliter of chloroform as the solvent, with reaction being conducted at 50° C., the major product is dimethylmethoxycyanosilane. This product is characterized by NMR analysis as having a proton NMR chemical shift of −0.697 p.p.m. relative to tetramethylsilane.

Example 33

When the procedure of Example 1 is used with 3 millimoles of dimethyldicyanosilane and 3 millimoles of dimethyldimethoxysilane as the reactants in 25 milliliter of chloroform as the solvent, with reaction being conducted at 50° C., the major product is dimethylmethoxycyanosilane. This product is characterized by NMR analysis as having proton NMR chemical shifts of −0.192 and −3.433 p.p.m. relative to tetramethylsilane.

Example 34

When the procedure of Example 1 is used with 2 millimoles of dimethyldicyanosilane and 2 millimoles of dimethyldithiocyanosilane as the reactants in 50 milliliter of chloroform as the solvent, with reaction being conducted at 60° C., the major product is dimethylthiocyanocyanosilane. This product is characterized by NMR analysis as having a proton NMR chemical shift of −0.456 p.p.m. relative to tetramethylsilane.

Example 35

When the procedure of Example 1 is used with 3 millimoles of dimethyldichlorosilane and 3 millimoles of dimethyldithiocyanosilane as the reactants in 50 milliliter of chloroform as the solvent, with reaction being conducted at 60° C., the major product is dimethylchlorothiocyanosilane. This product is characterized by NMR analysis as having a proton NMR chemical shift of −0.625 p.p.m. relative to tetramethylsilane.

Example 36

When the procedure of Example 1 is used with 2 millimoles of dimethyldithiocyanosilane and 2 millimoes of dimethylbismethylmercaptosilane as the reactants in 50 milliliter of chloroform as the solvent, with reaction being conducted at 60° C., the major product is dimethylmethylmercaptothiocyanosilane. This product is characterized by NMR analysis as having proton NMR chemical shifts of −0.533 and −2.125 p.p.m. relative to tetramethylsilane.

Example 37

When the procedure of Example 1 is used with 3 millimoles of diphenyldicyanosilane and 3 millimoles of diphenylbismethylmercaptosilane as the reactants in 50 milliliter of xylene as the solvent, with reaction being conducted at 120° C., the major product is diphenylcyanomercaptosilane.

Example 38

When the procedure of Example 1 is used with 4 millimoles of diethyldicyanatosilane and 4 millimoles of diethylbisdiethylaminosilane as the reactants in 50 milliliter of xylene as the solvent, with reaction being conducted at 25° C., the major product is diethyldiethylaminocyanatosilane.

Example 39

When the procedure of Example 1 is used with 2 millimoles of diphenyldicyanosilane and 2 millimoles of diphenyldicyanatosilane as the reactants in 50 milliliter of xylene as the solvent, with reaction being conducted at 100° C., the major product is diphenylcyanocyanatosilane.

Example 40

When the procedure of Example 1 is used with 3 millimoles of dibutyldicyanosilane and 3 millimoles of dibutyldiphenoxysilane as the reactants in 25 milliliter of xylene as the solvent, with reaction being conducted at 100° C., the major product is dibutylphenoxycyanosilane.

Example 41

When the procedure of Example 1 is used with 2 millimoles of diphenyldicyanatosilane and 2 millimoles of diphenyldithiophenylsilane as the reactants in 25 milliliter of xylene as the solvent, with reaction being conducted at 100° C., the major product is diphenylthiophenylcyanosilane.

Example 42

When the procedure of Example 1 is used with 4 millimoles of dibenzyldiazidosilane and 4 millimoles of dibenzyldicyanosilane as the reactants in 25 milliliters of xylene as the solvent, with reaction being conducted at 25° C., the major product is dibenzylcyanoazidosilane.

The present mixed compounds have utility in a variety of industrial applications, for example, as functional fluids e.g. for the transmission of pressure in hydraulic systems. The present compounds also have utility as dielectric materials, for example in condensers or transformers.

These compounds are generally characterized by biological activity such as in the form of insecticidal compositions.

The compounds of the invention are also useful as additives to polymers such as polyvinylchloride to provide plasticizing action. The various mixed compounds of the invention are also of utility as intermediates.

What is claimed is:

1. Mixed organosilane compounds having the general formula

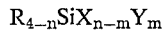
$$R_{4-n}SiX_{n-m}Y_m$$

in which R is selected from the group consisting of hydrocarbyl radicals having from 1 to 20 carbon atoms; X is different from Y and is selected from the group consisting of a halogen, alkoxyl, thioalkyl, dialkylamino, cyano, cyanate, thiocyanate, azide, and acetylide; Y is selected from the group consisting of cyano, cyanate and thiocyanate; $n$ is a whole number from 2 to 3, and $m$ is a whole number from 1 to 2, with the requirement that $m$ be less than $n$.

2. Process for the preparation of mixed organosilane compounds having the general formula

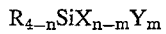
$$R_{4-n}SiX_{n-m}Y_m$$

in which R is selected from the group consisting of hydrocarbyl radicals having from 1 to 20 carbon atoms; X is different from Y and is selected from the group consisting of a halogen, alkoxyl, thioalkyl, dialkylamino, cyano, cyanate, thiocyanate, azide, and acetylide; Y is selected from the group consisting of cyano, cyanate and thiocyanate; $n$ is a whole number from 2 to 3, and $m$ is a whole number from 1 to 2, with the requirement that $m$ be less than $n$, which comprises mixing and reacting $R_{4-n}SiX_n$ and $R_{4-n}SiY_n$ in the mol proportion of 1:0.05 to 1:50 at a temperature of −20° C. to 300° C.

3. The compound methylbisthiomethylcyanatosilane.
4. The compound methylthiomethyldicyanatosilane.
5. The compound methyldithiocyanatochlorosilane.
6. The compound methyldicyanatobromosilane.
7. The compound methyldithiocyanatocyanatosilane.
8. The compound dimethylbromocyanosilane.
9. The compound dimethylthiocyanatocyanosilane.
10. The compound dimethylbromocyanatosilane.
11. The compound dimethylmethoxycyanosilane.
12. The compound dimethylchlorothiocyanatosilane.
13. The compound methylbisthiomethylcyanatosilane.
14. The compound methylthiomethyldicyanatosilane.
15. The compound methyldithiocyanatochlorosilane.
16. The compound methyldicyanatobromosilane.
17. The compound methyldithiocyanatocyanatosilane.

18. The compound dimethylbromocyanosilane.
19. The compound dimethylthiocyanatocyanosilane.
20. The compound dimethylbromocyanatosilane.
21. The compound dimethylmethoxycyanosilane.
22. The compound dimethylchlorothiocyanatosilane.

References Cited

UNITED STATES PATENTS

| | | | |
|---|---|---|---|
| 2,485,603 | 10/1949 | Joyce | 260—448.2 X |
| 3,032,575 | 5/1962 | Freitag et al. | |
| 3,357,949 | 12/1967 | Horn et al. | 260—448.2 X |

OTHER REFERENCES

Anderson I, J.A.C.S., 67, 1945, pp. 2176–77.
Anderson II, C.A., 38, 1944, p. 4528[5].
Anderson III, C.A., 47, 1953, p. 7930g.
Forbes et al., C.A., 40, 1946, p. 287[1].

TOBIAS E. LEVOW, Primary Examiner
P. F. SHAVER, Assistant Examiner

U.S. Cl. X.R.

252—63.2, 63.7, 66, 78, 64; 260—349, 448.8

PO-1050 (5/69)

UNITED STATES PATENT OFFICE
CERTIFICATE OF CORRECTION (Under Rul

Patent No. 3,466,314      Dated September 9, 1969

Inventor(s) Kurt Moedritzer et al

It is certified that error appears in the above-identified patent and that said Letters Patent are hereby corrected as shown below:

Column 5, line 66, "750°C" should be -- 75°C --.

SIGNED AND
SEALED

JUN 23 1970

(SEAL)
Attest:

Edward M. Fletcher, Jr.
Attesting Officer

WILLIAM E. SCHUYLER, JR.
Commissioner of Patents